(12) United States Patent
Stanhope et al.

(10) Patent No.: US 9,976,018 B2
(45) Date of Patent: May 22, 2018

(54) USE OF RECYCLED PACKAGING IN POLYMER COMPOSITE PRODUCTS

(71) Applicant: CPG International LLC, Scranton, PA (US)

(72) Inventors: Bruce Stanhope, Miamisburg, OH (US); Burch E. Zehner, Gahanna, OH (US); Bryan K. Buhrts, Wilmington, OH (US)

(73) Assignee: CPG International, LLC, Skokie, IL (US)

( * ) Notice: Subject to any disclaimer, the term of this patent is extended or adjusted under 35 U.S.C. 154(b) by 0 days. days.

(21) Appl. No.: 15/146,113

(22) Filed: May 4, 2016

(65) Prior Publication Data

US 2016/0244598 A1    Aug. 25, 2016

Related U.S. Application Data

(60) Continuation-in-part of application No. 14/830,823, filed on Aug. 20, 2015, which is a division of application No. 14/017,503, filed on Sep. 4, 2013.
(Continued)

(51) Int. Cl.
    *C08L 23/06* (2006.01)
    *C08L 67/02* (2006.01)
    (Continued)

(52) U.S. Cl.
    CPC .......... *C08L 23/06* (2013.01); *B29B 17/0042* (2013.01); *B29C 47/0004* (2013.01);
    (Continued)

(58) Field of Classification Search
    CPC ............ B29B 17/0042; B29C 47/0004; B29C 47/0016; B29C 47/0019; B29C 47/06;
    (Continued)

(56) References Cited

U.S. PATENT DOCUMENTS 5,194,461 A    3/1993   Berquist et al.
5,911,665 A    6/1999   Heydarour et al.
(Continued)

FOREIGN PATENT DOCUMENTS

EP    2402142 A2    1/2012
EP    2633975 A1    9/2013
(Continued)

OTHER PUBLICATIONS

Kontominas, Improving the Safety and Quality of Milk, Effects of Packaging on Milk Quality, 2010, Woodhead Publishing Limited, vol. 2, Improving Quality in Milk Products, pp. 136-154.
(Continued)

*Primary Examiner* — Frances Tischler
(74) *Attorney, Agent, or Firm* — Standley Law Group LLP

(57) ABSTRACT

A polymer composite and its method of manufacture using a recycled multilayer material. An example of the recycled multilayer material is comprised of a polyethylene/polyethylene terephthalate/aluminum film or polyethylene/nylon/aluminum film that may be extruded with organic filler to obtain desirable performance in wood-substitute products such as deck boards, railing, fencing, pergolas, residential cladding/siding, sheet products, and other applications.

32 Claims, 2 Drawing Sheets

Related U.S. Application Data

(60) Provisional application No. 61/696,476, filed on Sep. 4, 2012.

(51) Int. Cl.

| | | |
|---|---|---|
| *C08L 77/00* | (2006.01) | |
| *B29B 17/00* | (2006.01) | |
| *B29C 47/00* | (2006.01) | |
| *B29C 47/06* | (2006.01) | |
| *B32B 27/32* | (2006.01) | |
| *B29K 305/02* | (2006.01) | |
| *B29K 505/02* | (2006.01) | |
| *B29L 31/06* | (2006.01) | |
| *B29K 67/00* | (2006.01) | |
| *B29K 105/26* | (2006.01) | |
| *B29L 7/00* | (2006.01) | |
| *B29L 9/00* | (2006.01) | |
| *B29K 105/12* | (2006.01) | |
| *B29L 31/10* | (2006.01) | |
| *B29K 77/00* | (2006.01) | |
| *B29K 311/10* | (2006.01) | |
| *B29K 311/00* | (2006.01) | |
| *B29K 311/12* | (2006.01) | |
| *B29K 311/14* | (2006.01) | |

(52) U.S. Cl.
CPC .......... *B29C 47/0016* (2013.01); *B29C 47/06* (2013.01); *B32B 27/32* (2013.01); *C08L 67/02* (2013.01); *C08L 77/00* (2013.01); *B29C 47/0019* (2013.01); *B29C 47/065* (2013.01); *B29K 2023/06* (2013.01); *B29K 2067/00* (2013.01); *B29K 2067/003* (2013.01); *B29K 2077/00* (2013.01); *B29K 2105/12* (2013.01); *B29K 2105/26* (2013.01); *B29K 2305/02* (2013.01); *B29K 2311/00* (2013.01); *B29K 2311/10* (2013.01); *B29K 2311/12* (2013.01); *B29K 2311/14* (2013.01); *B29K 2505/02* (2013.01); *B29L 2007/008* (2013.01); *B29L 2009/00* (2013.01); *B29L 2009/003* (2013.01); *B29L 2009/005* (2013.01); *B29L 2009/008* (2013.01); *B29L 2031/06* (2013.01); *B29L 2031/10* (2013.01); *C08J 2323/06* (2013.01); *C08J 2367/02* (2013.01); *C08L 2207/20* (2013.01); *Y02W 30/62* (2015.05)

(58) Field of Classification Search
CPC .............. B29C 47/065; B29K 2023/06; B29K 2067/00; B29K 2067/003; B29K 2077/00; B29K 2105/12; B29K 2105/26; B29K 2305/02; B29K 2311/00; B29K 2311/10; B29K 2311/12; B29K 2311/14; B29K 2505/02; B29L 2007/008; B29L 2009/00; B29L 2009/003; B29L 2009/005; B29L 2009/008; B29L 2031/06; B29L 2031/10; B32B 27/32; C08J 2323/06; C08J 2367/02; C08L 2207/20; C08L 23/06; C08L 67/02; C08L 77/00; Y02W 30/62
See application file for complete search history.

(56) References Cited

U.S. PATENT DOCUMENTS

| | | |
|---|---|---|
| 6,844,040 B2 | 1/2005 | Pabedinskas et al. |
| 7,445,840 B2 | 11/2008 | Moriya et al. |
| 2002/0018907 A1 | 2/2002 | Zehner |
| 2003/0065082 A1 | 4/2003 | Blanken et al. |
| 2006/0222796 A1* | 10/2006 | Morris ................... B32B 27/08 428/35.7 |
| 2009/0176912 A1 | 7/2009 | Maldas et al. |
| 2010/0159213 A1 | 6/2010 | Przybylinski et al. |
| 2012/0027981 A1 | 2/2012 | Belcher, Jr. et al. |
| 2012/0119414 A1 | 5/2012 | Van Helden |

FOREIGN PATENT DOCUMENTS

| | | |
|---|---|---|
| WO | 2010019535 A1 | 2/2010 |
| WO | 2011022828 A1 | 3/2011 |
| WO | 2011086292 A1 | 7/2011 |

OTHER PUBLICATIONS

Schubert, How Aluminum Foil Improves the Hot Tack of Packaging Laminates, 2006, Tappi Place conference Sep. 17-21, 2006. http://www.tappi.org/content/enewsletters/eplace/2007/06PLA20.pdf.
Polymer Reaction Engineering—2.1.1 Polyethylene types, 2007, Blackwell Publishing, p. 31.

* cited by examiner

USE OF RECYCLED PACKAGING IN POLYMER COMPOSITE PRODUCTS

This application is a continuation-in-part of U.S. application Ser. No. 14/830,823, filed Aug. 20, 2015, which is a divisional of U.S. application Ser. No. 14/017,503, filed Sep. 4, 2013, which claims the benefit of U.S. Provisional Application No. 61/696,476, filed Sep. 4, 2012, each of which is hereby incorporated by reference in its entirety.

BACKGROUND AND SUMMARY OF THE INVENTION

Exemplary embodiments of the present invention relate generally to composite products and related methods for manufacturing such products. Composite materials can offer many benefits as compared to natural materials such as wood. However, despite many years of development, there is still a need to improve the formulation, manufacturing, and resulting characteristics of composite materials.

Many composite products are made from virgin materials. However, virgin materials may be in limited supply and/or costly. Thus, there is a need to use at least a portion of recycled material in the formulation of a composite. There is also a need to use at least a portion of recycled material for sustainability reasons and also to potentially earn LEED points.

There is also a need to be able to incorporate a wider range of materials into the composite. The ability to use a broader range of materials (including materials such as lubricants, processing aids, etc.) may facilitate the manufacturing of composite products due to the increased availability of suitable materials. For example, it may be desirable to use different types of recycled material including materials with multiple polymer, filler, and additive materials within the recycled material construction, which may not be an option with typical composites. For another example, one particular material in a multilayer construction may be most important, yet it is still desirable to be able to incorporate the other materials in the multilayer construction to allow for more flexibility in material selection. In addition, the increased availability of suitable materials may help to control the cost of the composite product.

A drawback of typical composites using recycled materials is that the physical characteristics of the composites may lack in comparison to the same composites made with virgin materials. For example, characteristics such as coefficient of thermal expansion, modulus of rupture, modulus of elasticity, moisture sensitivity, peak load, and other mechanical characteristics may be adversely impacted by the use of recycled materials in many common composites. With respect to decking products such as deck planks and rails, the reduction of such characteristics may lead to increased sagging or other types of deterioration. Accordingly, there is a need to be able to use recycled materials and still maintain the same or similar physical characteristics relative to comparable virgin materials.

Additionally, there is a need to improve the manufacturability of composite materials to obtain desirable products. For instance, the use of recycled materials may impact the extrudability of the composite material. It may also limit the adhesion of a cap layer to a substrate.

Furthermore, when exposed to the sun, composite materials can become hot to the touch, especially relative to natural wood. As such, there is a need to transfer heat away from a surface of a composite product and/or minimize the static charge of a composite material. In particular, there is a need to transfer heat away from or otherwise cool the surface of composite decking and railing components.

Present exemplary embodiments may satisfy some or all of the aforementioned needs. An exemplary embodiment may use recycled packaging (e.g., juice pouches or other types of aluminized packaging) or other types of multilayer materials (e.g., films) in the production of a polyethylene, polypropylene, other olefin, or ionomer composite to obtain one or more of the aforementioned advantages. Another example may include metal filler in a composite, which may assist with transferring heat away and/or dissipating a static charge from the surface of a composite product. Yet another embodiment may include polyethylene terephthalate (PET). The use of PET may, for example, effectively act as a compatibilizer to allow for the incorporation of a wider range of materials into the composite. In some embodiments, PET may also improve the adhesion of a capstock layer to a substrate. Accordingly, examples of recycled packaging or other multilayer materials may include PET and/or a metallic layer such as may be found in recycled beverage pouches or other liquid containers. While PET may be particularly beneficial, other embodiments may include another polyester instead of or in addition to PET. Other examples of recycled packaging or other multilayer materials may include nylon, with or without a metallic layer. In addition, certain embodiments may combine different types of recycled packaging or other multilayer materials (e.g., a combination of recycled packaging or other multilayer materials that include PET with recycled packaging or other multilayer materials that include nylon). Further embodiments may include improvements in the incorporation of other ingredients and/or in processing conditions to facilitate manufacturing of the aforementioned composites that have the same, similar, or improved physical characteristics relative to a comparable control.

In certain exemplary embodiments, the inventors have overcome a difficulty in using recycled materials, particularly multilayer materials such as recycled packaging (e.g., juice packs and other types of aluminized packaging). Multilayer materials are often for a single use and disposable, which places a burden on landfills that are nearly filled to capacity. In fact, The Freedonia Group has estimated that approximately one-third of all municipal solid waste in the United States consists of discarded packaging. As such, there is a need to be able to reuse discarded packaging, particularly multilayer plastics.

In many multilayer materials, the combined polymer layers are beneficial for packaging such as for barrier properties, but are difficult to re-utilize. Multilayer recycled plastics cannot be readily separated back into the individual components such as high density polyethylene. In the combined form, certain layers melt at different process temperatures than other polymer layers, and some layers such as an aluminum coating do not melt at all at polymer processing temperatures. There has thus been a difficulty in recycling multilayer plastics (e.g., flexible packaging) due to the combination of different materials in the laminate. Enval, which is based in the United Kingdom, uses microwave-induced pyrolysis technology to separate laminate materials into the individual components. However, this technology is costly, time-consuming, and requires an undesirable amount of energy to achieve the separation of the individual components.

In view of these difficulties, it is surprising that the inventors have identified a class of materials and, for example, particular combinations of polyethylene/PET/aluminum film and polyethylene/nylon/aluminum film, as well as other polyethylene, polypropylene, olefin, and ionomer multilayer materials, that may be extruded successfully and also provide desirable performance in wood-substitute products that may be used, for example, in deck boards, railing, fencing, pergolas, residential cladding/siding, and other applications.

In addition to the novel features and advantages mentioned above, other benefits will be readily apparent from the following descriptions of the drawings and exemplary embodiments.

DETAILED DESCRIPTION OF EXEMPLARY EMBODIMENT(S)

Figure 1:
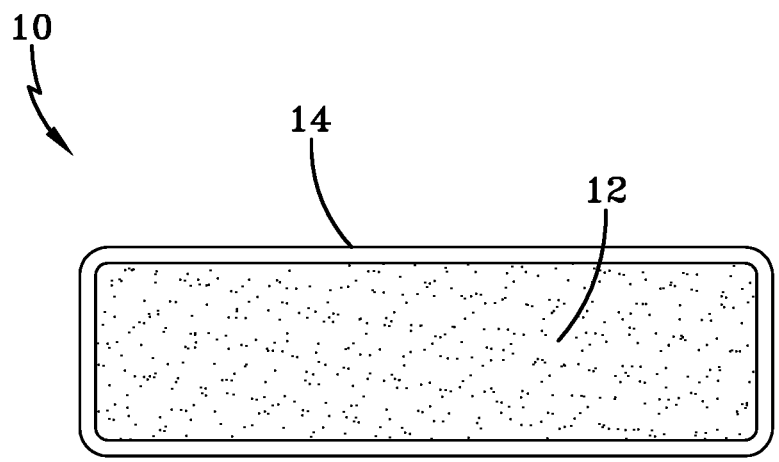
FIG. 1 is a side elevation view of an exemplary embodiment of a composite product of the present invention.

Exemplary embodiments of the present invention are directed to composite materials and products and related methods of manufacturing. An exemplary composite material may include at least one of polyethylene, polypropylene, other olefin (e.g., polyolefin), or ionomer. Other exemplary embodiments may include at least one of polyethylene terephthalate (PET), nylon, and metal filler. In particular, one embodiment of a composite may include polyethylene, PET, and metal with recycled packaging (e.g., used beverage pouches, other liquid containers, or other aluminized packaging). Another exemplary embodiment of a composite may include polyethylene, nylon, and metal with recycled packaging (e.g., used beverage pouches, other liquid containers, or other aluminized packaging). Other types of used multilayer packaging or films comprising at least one of the aforementioned materials may also be used. For example, other multilayer packaging or films, not limited to beverage pouches such as juice packs, other liquid containers, or aluminized packaging, may be used. While the use of recycled materials (e.g., polyethylene, PET, nylon, and metal) may be particularly beneficial to reduce cost or increase material availability, virgin materials may also be used unless expressly set forth otherwise. As aforementioned, PET may increase the polarity of an exemplary embodiment of the composite, thereby enabling a wider range of materials to be incorporated into the composite. In effect, PET may act as a compatibilizer for other materials. PET may also enhance the heat distortion temperature, which may be beneficial for reducing sagging. In sum, PET may offer substantial benefits, particularly in a polyethylene composite. However, other exemplary embodiments described herein may not include a polyester or may incorporate another polyester instead of or in addition to PET. On the other hand, the use of metal filler in an exemplary embodiment of the composite may assist with transferring heat away from the surface of the composite, such that the composite does not feel as hot relative to a comparable product when exposed to the sun. The metal may also serve to dissipate a static charge from the surface of the composite.

In one exemplary embodiment, recycled packaging (e.g., beverage pouches) may be 100% substituted for virgin or recycled polyethylene (e.g., high density polyethylene or HDPE), polypropylene, other olefin, ionomer, or another suitable polymer in a composite. However, in other exemplary embodiments, recycled packaging may be partially substituted for virgin or recycled polyethylene or another suitable polymer in a composite. Also, as previously mentioned, other types of suitable multilayer materials (e.g., various films or other liquid containers) may be used in the foregoing embodiments in place of recycled beverage pouches. In any event, one exemplary embodiment may be comprised of a single recycle stream or type of multilayer material, or different recycle streams and/or different types of multilayer materials may be mixed for use in other exemplary embodiments of the present invention.

An example of recycled packaging (e.g., juice pouches) or other multilayer film or materials may be comprised of at least one recycle stream such that the recycled packaging is comprised of polyethylene (e.g., HDPE) in an amount of about 70-92% by weight, more preferably about 75-90% by weight, and still more preferably about 75%-85% by weight; PET, another polyester, and/or nylon in a total amount of about 1-20% by weight, more preferably about 5-15% by weight, and still more preferably about 5-12% by weight; and metal (e.g., aluminum) in an amount of about 1-20% by weight, more preferably about 3-15% by weight, and still more preferably about 3-12% by weight. Examples of other metallic species include, but are not limited to, magnesium (Mg), silicon (Si), calcium (Ca), titanium (Ti), iron (Fe), copper (Cu), steel, and metallic carbonates such as calcium carbonate. Also, in furtherance of this example, one particularly beneficial embodiment of recycled packaging (e.g., juice pouches) or other multilayer film or materials may be comprised of nylon in an amount less than about 20% by weight of the recycle stream(s). In an exemplary embodiment, one particularly useful recycled juice pouch is comprised of HDPE in an amount of about 75-85% by weight, PET in an amount of about 8-12% by weight, and aluminum in an amount of approximately 8-12% by weight. In another exemplary embodiment, a particularly useful recycled juice pouch is comprised of HDPE in an amount of about 75-85% by weight, nylon in an amount of about 5-12% by weight (more preferably about 5-10% by weight), and aluminum in an amount of approximately 8-12% by weight. In some exemplary embodiments, one or more other metallic species such as, but not limited to, steel, copper, magnesium, silicon, calcium, titanium, iron, and metallic carbonates such as calcium carbonate, may respectively be included in an amount up to about 2% by weight. Other types of multilayer materials comprising at least one of polyethylene, polypropylene, other olefins, or ionomer (e.g., SURLYN™ by Dupont) may be used. Additional examples of recycled packaging or other multilayer materials may include at least one of polyester (e.g., PET), nylon, and metal. PET may be particularly beneficial when used in combination with polyethylene. However, as aforementioned, some exemplary embodiments may include other types of polyester instead of or in addition to PET. On the other hand, the use of nylon may allow for the use of a wider range of multilayer materials.

In light of the aforementioned materials and content of examples of recycled packaging, particularly a recycled juice pouch, an exemplary embodiment of a composite may be comprised of the following ingredients by weight:

| | |
|---|---|
| organic filler | 40-60%, more preferably 45-55% |
| inorganic filler | 0-25%, more preferably 10-20% |
| lubricant | 1-10%, more preferably 3-8% |
| recycled packaging | 1-60%, more preferably 2-35% |
| coupling agent | 0-5%, more preferably 0-4% |

In another exemplary embodiment, recycled packaging may be included in an amount of 20-60% by weight, more preferably 20-35% by weight, wherein the other ingredients of the above example may remain in the same ranges. In one exemplary embodiment comprising nylon, nylon may be present in an amount less than about 20% by weight of the composite. Furthermore, in lieu of recycled packages, other multilayer films or applicable (e.g., virgin or recycled) portions of at least one of polyethylene, PET, nylon, and metal may be used. For instance, another example may comprise a polymer in addition to the recycled packaging. One such exemplary embodiment may be comprised of the following ingredients by weight:

| | |
|---|---|
| polyethylene | 10-30% |
| organic filler | 40-60%, more preferably 45-55% |
| inorganic filler | 0-25%, more preferably 10-20% |
| lubricant | 1-10%, more preferably 3-8% |
| recycled packaging | 1-30%, more preferably 10-30% |
| coupling agent | 0-5%, more preferably 0-4% |

Similar to the previous example, nylon may be present in an amount less than about 20% by weight of the composite in this exemplary embodiment of the invention. Also with respect to these examples, other examples of recycled packaging may include at least one of polypropylene, other olefin, or ionomer in addition to or as an alternative to polyethylene. Also, some exemplary embodiments may include polypropylene, other olefin, or ionomer as a replacement for all or a portion of polyethylene. In addition, some exemplary embodiments may not include at least one of PET, nylon, and metal.

The inventors have discovered that the use of recycled material, particularly multilayer material such as from recycled beverage pouches comprising polyethylene, polypropylene, other olefin, and/or ionomer, as well as polyester (e.g., PET), nylon, and/or metal, may cost effectively substitute for plastic and organic filler (e.g., wood flour) in cellulosic composites. Reducing the total percent of wood flour content improves moisture-related properties in the composite because less moisture will absorb into the composite for any given temperature and humidity exposure level. Another benefit is the reduction of swelling of, for example, deck boards, which have a tendency to end swell or flare at the ends.

The inventors have also discovered that 1) pre-drying the cellulosic filler and the multilayer material; 2) using coupling agent; and/or 3) using higher processing temperatures may facilitate the optimization of the properties of the composite (e.g., to obtain properties that are the same, similar, or improved relative to a comparable product comprising polyethylene, polypropylene, other olefin, or ionomer instead of recycled multilayer materials). For some embodiments, examples of effective coupling agents include olefinic maleic anhydride type coupling agents such as, but not limited to, CHEMTURA POLYBOND™.

In one example of a full size deck plank comprising a core of a composite of the present invention that was coextruded with a cellulosic composite outer shell, the use of recycled packaging in combination with virgin polyethylene for the core, provided the following results in Table A:

TABLE A

| | Peak Load (lbf) | MOR (psi) | MOE (psi) |
|---|---|---|---|
| Min | 598 | 2857 | 531709 |
| Max | 656 | 3133 | 647858 |
| Avg | 631 | 3013 | 572209 |
| Std. Dev. | 14 | 67 | 22986 |
| CoV | 2.2% | 2.2% | 4.0% |

The test results for a similar control (with recycled polyethylene substituted for the recycled packaging) are shown below in Table B:

TABLE B

| | Peak Load (lbf) | MOR (psi) | MOE (psi) |
|---|---|---|---|
| Min | 608 | 2903 | 545510 |
| Max | 645 | 3079 | 619097 |
| Avg | 622 | 2973 | 572640 |
| Std. Dev. | 10 | 50 | 22481 |
| CoV | 1.7% | 1.7% | 3.9% |

By comparing Table A to Table B, it can be seen that the results for peak load, modulus of elasticity (MOE), and modulus of rupture (MOR) for an exemplary embodiment of the invention are similar to the results for a comparable control. It was also found that processing temperatures that are about 10-30° F. higher than typically used for the control may optimize the properties of the composite relative to the control. For instance, in one example, the use of processing temperatures that were about 20 degrees higher (e.g., 350-370° F.) than used for the control (e.g., 330-350° F.) improved the coefficient of thermal expansion to be substantially similar to that of the control. Furthermore, the use of inorganic filler (e.g., metal) improves the stiffness of the composite, and the use of glass fibers as an inorganic filler may also improve mechanical properties.

In other examples with no outer shell, wood plastic composite (WPC) bars (having smaller dimensions than the full size deck board of the prior example) yielded the following flexural test results relative to a control:

| SAMPLE COMPOSITE | Peak Load (lbf) | MOR (psi) | MOE (psi) |
|---|---|---|---|
| Virgin HDPE and Recycled PE (control) | 72 | 2,443 | 391,085 |
| Recycled Juice Pouches | 53 | 1,654 | 325,826 |
| Recycled Juice Pouches with 2% Coupling Agent | 67 | 2,302 | 383,941 |

A particularly useful example of a metal filler is aluminum. Aluminum is commonly used in multilayer materials such as for beverage pouches. In exemplary embodiments, other types of metal may also be used, including, but not limited to, iron, steel, copper, magnesium, silicon, calcium, titanium, and metallic carbonates such as calcium carbonate. However, as previously explained, some embodiments may not include metal.

Organic material (e.g., cellulosic material) may be virgin or recycled. One example of organic material that may be used is wood flour. Other examples of organic material include sawdust, newspapers, alfalfa, wheat pulp, wood chips, wood fibers, wood particles, ground wood, flax, wood flakes, wood veneers, wood laminates, paper, cardboard, straw, wheat straw, cotton, rice hulls, coconut shells, corn cobs, peanut shells, bagasse, plant fibers, bamboo fiber, palm fiber, carbon fiber, kenaf, jute, and other similar or suitable materials.

Any of the wood examples may be hard or soft wood or variations thereof. Furthermore, any desired mesh size of the cellulosic material may be used. With regard to wood flour, an exemplary range of mesh size is about 10 to about 100 mesh, more preferably about 20 mesh to about 80 mesh depending on the desired characteristics of components fabricated using exemplary embodiments of the composite material.

Inorganic fillers may be substituted for all or a portion of the cellulosic filler material. Inorganic fillers typically do not require the special processing or molding conditions necessitated by the use of cellulosic materials. The use of inorganic fillers may allow for a composite material having a greater bulk density and may permit higher rates of extrusion than a composite material that includes only cellulosic material. Inorganic fillers may also allow the aggregate to be molded into articles having reduced moisture sensitivity and reduced flame and smoke spread, while at the same time enhancing mechanical properties. Talc may provide particularly beneficial results as an inorganic filler. Other examples of inorganic fillers include mica, glass fibers, calcium carbonate, kaolin clay, magnesium dioxide, titanium dioxide, silica, barium sulfate, and wollastonite. As aforementioned, glass fibers may be particularly useful for enhancing the mechanical properties of an exemplary composite.

An exemplary embodiment of a composite material may also include other ingredients such as cross-linking agents, blowing agents, foaming agents, foam modifiers, lubricants, coupling agents, stabilizers, accelerators, inhibitors, enhancers, compatibilizers, thermosetting materials, weathering additives, rubber, colorants, process aids, and streaking materials.

Cross-linking agents may be added to exemplary embodiments of the composite material to improve the properties of some exemplary embodiments. Cross-linking agents may include thermosetting materials such as polyurethanes (e.g., isocyanates), phenolic resins, unsaturated polyesters, and epoxy resins. The use of cross-linking agents may, for example, reduce moisture absorption and increase the strength of components manufactured from the composite material.

While one embodiment of a composite material may be used in fabricating articles of solid construction, another embodiment of the composite material may be used in fabricating articles of foamed construction. Foaming or blowing agents as well as foam modifiers may be added to an example of the composite material to produce a foamed component, if desired. Because a composite material that produces a foamed component uses significantly less polymer (plastic) material than a similarly-sized solid component, both the cost of the composite material and the components manufactured therefrom may be reduced. The use of a foaming or blowing agent as well as foam modifiers in lieu of a solid material also allows for produced components of a reduced weight. Examples of foam modifiers include acrylic foam modifiers and other suitable foam modifiers. A blowing agent may be an endothermic or exothermic blowing agent.

Depending on the result desired in fabricated components, other materials may also be added to exemplary embodiments of the composite material. For example, stabilizers such as tin stabilizers, lead and metal soaps such as barium, cadmium, and zinc, and other suitable stabilizers may be added to the composite material to help prevent the breakdown of the plastic material during processing. Other materials, such as accelerators, inhibitors, enhancers, compatibilizers, and combinations thereof may be used to affect the bonding, or rate of bonding, of the individual components fabricated using exemplary embodiments of the composite material. Other process aids, such as, for example, acrylic process aids, may be included in exemplary embodiments of the composite material to aid in the fusion during fabrication of components using an exemplary composite material or otherwise enhance the properties of fabricated components. Dow K-120N and Dow K-175 are examples of acrylic process aids that are available from Dow Chemical.

During the component fabrication process, using exemplary embodiments of the composite material, both internal and external lubricants may be used to aid in the molding process. Examples of lubricants include zinc stearate, calcium stearate, esters, amide wax, paraffin wax, and ethylene bis-stearamide. Lubricants may be included in the exemplary embodiments of the composite material to assist the processing of the composite material through an extruder, compounder, or other processing device and to help facilitate mold release.

Examples of weathering additives include titanium dioxide and other ultraviolet absorbers. Ultraviolet absorbers also include organic chemical agents such as benzophenone and benzotriazole types.

Streaking materials may be added to exemplary embodiments of the composite material to enhance the natural-grain appearance of some components. In some exemplary embodiments, the streaking polymer and the base plastic material may be substantially the same polymer or different polymers. For example, in one embodiment, a composite crystalline polymer and a non-amorphous streaker polymer may be substantially the same or different polymers.

An exemplary embodiment of a composite material may be used to produce components by any of the traditional molding means, including, but not limited to: extrusion, pultrusion, compression molding, and injection molding. In an exemplary manufacturing method, recycled packages may be shredded, cut, or otherwise formed into relatively small particles to facilitate incorporation into the composite. For example, recycled beverage packages may be shredded prior to introduction into an extruder. In another exemplary embodiment, recycled packages (e.g., juice pouches) may be shredded and then melt extruded and pelletized for later introduction into a compound extruder to produce an article or product (e.g., deck planks). In yet another example, the entire composite, including recycled packaging, may be pelletized for later introduction into an extruder.

Figure 2:
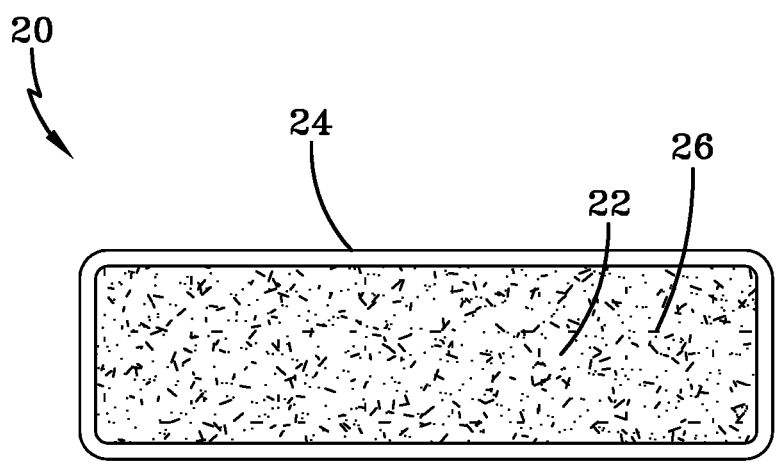
FIG. 2 is a side elevation view of another exemplary embodiment of a composite product of the present invention.

FIG. 1 shows an example of one embodiment of a deck component 10. In this example, the deck board 10 is comprised of a substrate (i.e., core) 12 and a cap layer 14. FIG. 2 shows another embodiment of a deck board 20 comprised of a substrate (i.e., core) 22 and a cap layer 24. Each of these layers may be comprised of a composite of the present invention. However, in the example of FIG. 1, only the substrate 12 is comprised of a composite of the present invention. For one example, the substrate 12 may be comprised of at least polyethylene and PET and/or nylon as previously described. As another example, substrate 22 also includes metal filler 26 as previously described.

In one exemplary embodiment, the cap layer may be a polyolefin-based material that has enhanced resistance to degradation and scratching. In still another exemplary embodiment, the cap layer may include a cellulosic material and/or a streaker material. A cap layer may also be a material as described herein.

One exemplary embodiment of a cap layer may be made from a plastic material, which may, for example, be comprised of a blend of two or more polymers. In particular, any number of polymers may be used to obtain a blend having desirable weathering characteristics. For instance, examples of a blend include, but are not limited to, polyethylene compounds, polypropylene compounds, olefin compounds (e.g., ionic olefin compounds), ionomers, and other similar or suitable alloys, compounds, and mixtures having desirable weathering, aesthetic, degradation, and/or durability characteristics. In other exemplary embodiments, a suitable composite may be used as a cap layer. An example of a composite may be comprised of polyethylene, polypropylene, other olefins, ionomer, or any other similar or suitable plastic.

In an exemplary embodiment, a polyethylene, polypropylene, olefin, or ionomer compound or mixture may be useful for making a cap layer having desirable resistance to scratching and/or to degradation such as may be caused by UV light or other environmental factors. For example, a polyethylene compound or mixture may include polyethylene in an amount between about 20% by weight and about 70% by weight. In still another exemplary embodiment, a polyethylene compound or mixture may include polyethylene in an amount between about 20% and about 40% by weight.

Another example of a cap layer may be a composite or blend that has more desirable aesthetic characteristics. An exemplary embodiment of a composite may or may not be a blend of two or more polymers. Furthermore, as previously mentioned, an example of a composite or blend may be comprised of polyethylene, polypropylene, olefin, ionomer, or any other similar or suitable plastic. For instance, in order to obtain a more desirable appearance for some applications, exemplary embodiments may include a core of a composite of the present invention and a cap layer of an organic (e.g., cellulosic) composite or a cap layer that does not include any organic filler (e.g., an olefinic capstock), which may, for example, be coextruded.

While FIGS. 1 and 2 show examples of a capped product, other examples of a product made from a material of the present invention may not include a cap layer. In other words, other examples of products may have an exposed, uncapped construction. Additionally, other examples of products may have a hollow construction. The hollow construction may or may not include a cap layer.

Figure 3:
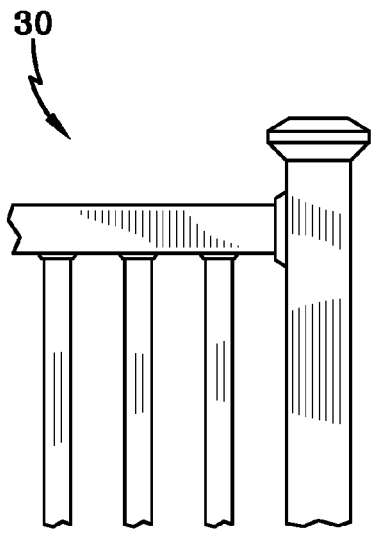
FIG. 3 is a side elevation view of an exemplary embodiment of a rail system of the present invention.
Figure 4:
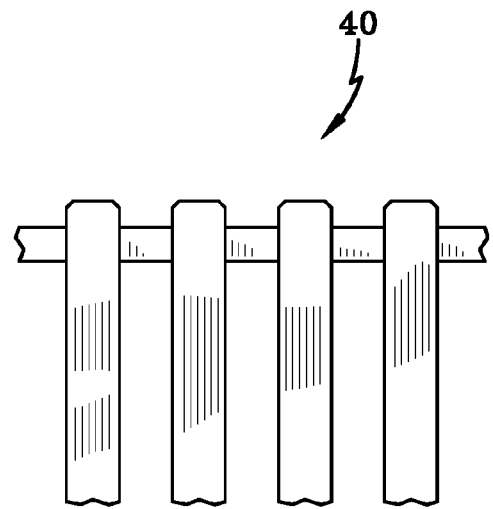
FIG. 4 is a side elevation view of an exemplary embodiment of a fence system of the present invention.
Figure 5:
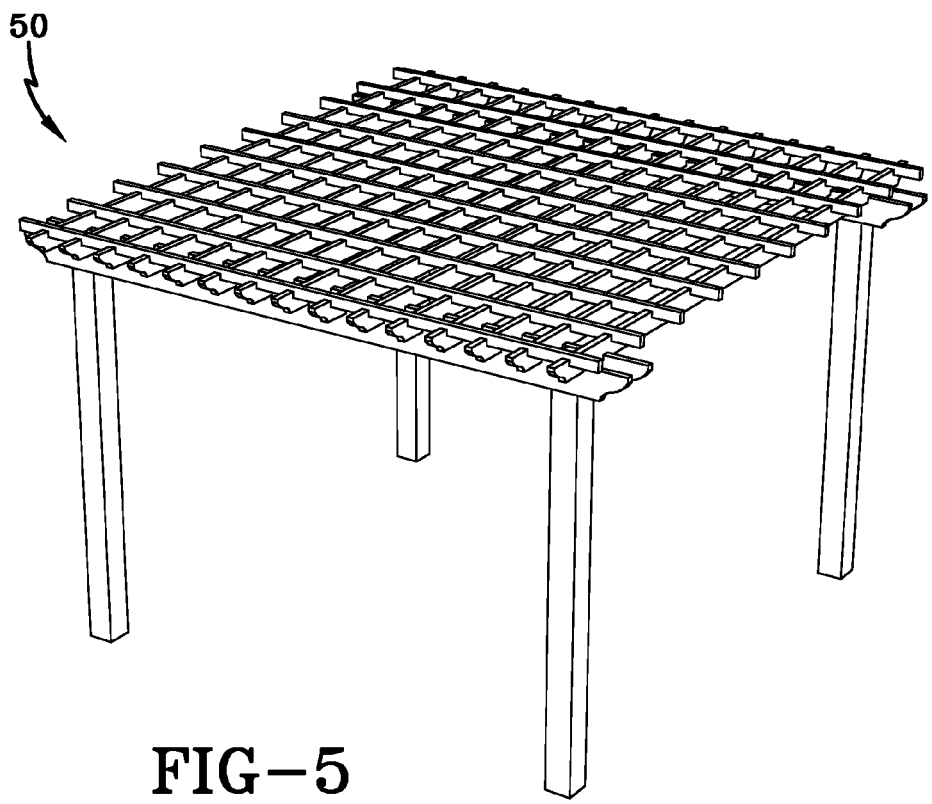
FIG. 5 is a perspective view of an exemplary embodiment of a pergola of the present invention.

In addition to deck boards, an exemplary embodiment of a composite material may be used for making other composite products such as, but not limited to, other deck components, deck systems, rails, rail components, rail systems, fence components, fence systems, siding, siding components, siding systems, pergolas, pergola components, sheet products, and a number of other components. For example, FIG. 3 shows one embodiment of a rail system 30 that may be made. Other exemplary embodiments of products that may be made include a fence system 40 such as shown in FIG. 4 and a pergola 50 such as shown in FIG. 5. Various other components may be formed by exemplary embodiments, including various other planks and railing components including, but not limited to, planks, posts, caps, top rails, support rails, universal rails, balusters, spindles, post sleeves, inside corner molding, and other railing components. Further components that may benefit from exemplary embodiments of the composite material include planks, posts, siding, siding accessories, interior and exterior decorative house moldings, crown moldings, chair rails, baseboards, door moldings, partitions (e.g., bathroom partitions), picture frames, furniture components, window moldings, window components, window lineals, window frames, door components, door frames, roof components, fence posts, fence rails, floor components, and other suitable indoor and outdoor items. In addition, exemplary embodiments of the composite material may be used to manufacture other types of products that are commonly made from wood, composites, metal, or plastic. Any of the aforementioned products may be capped or uncapped.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the invention.

What is claimed is:

1. A polymer composite comprising:
    recycled multilayer material in an amount of 1-60% by weight, said recycled multilayer material consisting essentially of recycled aluminized packaging, said recycled aluminized packaging comprising:
        i) at least one of polyethylene terephthalate and nylon in a total amount of 5-15% by weight;
        ii) polyethylene in an amount of 75-90% by weight; and
        iii) aluminum in an amount of 3-15% by weight; and
    organic filler in an amount of 40-60% by weight.

2. The polymer composite of claim 1 wherein said recycled aluminized packaging comprises said nylon.

3. The polymer composite of claim 1 wherein said recycled aluminized packaging comprises said nylon in an amount up to about 15% by weight.

4. The polymer composite of claim 1 wherein said recycled aluminized packaging comprises said nylon in an amount of about 5-12% by weight.

5. The polymer composite of claim 1 wherein said recycled multilayer material is in an amount of about 2-35% by weight.

6. A polymer composite comprising:
    polyethylene in an amount of 10-30% by weight;
    recycled multilayer material in an amount of 10-30% by weight, said recycled multilayer material consisting essentially of recycled aluminized packaging, said recycled aluminized packing comprising:
        i) at least one of polyethylene terephthalate and nylon in a total amount of 5-15% by weight;
        ii) polyethylene in an amount of 75-90% by weight; and
        iii) aluminum in an amount of 3-15% by weight; and
    organic filler in an amount of 40-60% by weight.

7. The polymer composite of claim 6 wherein said recycled aluminized packaging comprises said nylon.

8. The polymer composite of claim 6 wherein said recycled aluminized packaging comprises said nylon in an amount up to about 15% by weight.

9. The polymer composite of claim 6 wherein said recycled aluminized packaging comprises said nylon in an amount of about 5-12% by weight.

10. The polymer composite of claim 4 wherein said nylon is in an amount of about 5-10% by weight.

11. The polymer composite of claim 4 wherein said aluminum is in an amount of about 8-12% by weight of said recycled aluminized packaging.

12. The polymer composite of claim 1 wherein said recycled aluminized packaging comprises said polyethylene terephthalate and said nylon.

13. The polymer composite of claim 1 wherein said at least one of said polyethylene terephthalate and said nylon is in a total amount of 5-12% by weight of said recycled aluminized packaging.

14. The polymer composite of claim 1 wherein said polyethylene is in an amount of 75-85% by weight of said recycled aluminized packaging.

15. The polymer composite of claim 1 wherein said aluminum is in an amount of 3-12% by weight of said recycled aluminized packaging.

16. The polymer composite of claim 1 wherein:
said at least one of said polyethylene terephthalate and said nylon is in a total amount of 5-12% by weight of said recycled aluminized packaging;
said polyethylene is in an amount of 75-85% by weight of said recycled aluminized packaging; and
said aluminum is in an amount of 3-12% by weight of said recycled aluminized packaging.

17. The polymer composite of claim 16 wherein said recycled multilayer material is in an amount of about 2-35% by weight.

18. The polymer composite of claim 1 wherein said polyethylene is HDPE.

19. The polymer composite of claim 1 wherein said recycled aluminized packaging comprises said polyethylene terephthalate.

20. The polymer composite of claim 1 wherein said recycled aluminized packaging comprises said polyethylene terephthalate in an amount of about 8-12% by weight.

21. The polymer composite of claim 20 wherein said aluminum is in an amount of about 8-12% by weight of said recycled aluminized packaging.

22. The polymer composite of claim 9 wherein said nylon is in an amount of about 5-10% by weight.

23. The polymer composite of claim 9 wherein said aluminum is in an amount of about 8-12% by weight of said recycled aluminized packaging.

24. The polymer composite of claim 6 wherein said recycled aluminized packaging comprises said polyethylene terephthalate and said nylon.

25. The polymer composite of claim 6 wherein said at least one of said polyethylene terephthalate and said nylon is in a total amount of 5-12% by weight of said recycled aluminized packaging.

26. The polymer composite of claim 6 wherein said polyethylene is in an amount of 75-85% by weight of said recycled aluminized packaging.

27. The polymer composite of claim 6 wherein said aluminum is in an amount of 3-12% by weight of said recycled aluminized packaging.

28. The polymer composite of claim 6 wherein:
said at least one of said polyethylene terephthalate and said nylon is in a total amount of 5-12% by weight of said recycled aluminized packaging;
said polyethylene is in an amount of 75-85% by weight of said recycled aluminized packaging; and
said aluminum is in an amount of 3-12% by weight of said recycled aluminized packaging.

29. The polymer composite of claim 6 wherein said polyethylene is HDPE.

30. The polymer composite of claim 6 wherein said recycled aluminized packaging comprises said polyethylene terephthalate.

31. The polymer composite of claim 6 wherein said recycled aluminized packaging comprises said polyethylene terephthalate in an amount of about 8-12% by weight.

32. The polymer composite of claim 31 wherein said aluminum is in an amount of about 8-12% by weight of said recycled aluminized packaging.

\* \* \* \* \*